United States Patent [19]

Brahms et al.

[11] Patent Number: 5,027,434

[45] Date of Patent: Jun. 25, 1991

[54] APPARATUS FOR BIDIRECTIONAL TRANSMISSION OF OPTICAL SIGNALS

[75] Inventors: Martin Brahms, Hanover; Ziaedin Chahabadi, Bad Munder; Johannes Ocker, Hanover, all of Fed. Rep. of Germany

[73] Assignee: ke kommunikations-Elektronik GmbH & Co., Hanover, Fed. Rep. of Germany

[21] Appl. No.: 447,400

[22] Filed: Dec. 7, 1989

Related U.S. Application Data

[63] Continuation-in-part of Ser. No. 261,344, Oct. 24, 1988, abandoned.

[30] Foreign Application Priority Data

Oct. 24, 1987 [DE] Fed. Rep. of Germany ....... 3736082

[51] Int. Cl.⁵ .............................................. H04B 10/00
[52] U.S. Cl. .................................... 455/606; 455/617; 455/609; 455/612; 455/613
[58] Field of Search ............... 455/606, 607, 609, 610, 455/612, 613, 617, 618; 370/4

[56] References Cited

U.S. PATENT DOCUMENTS

| | | | |
|---|---|---|---|
| 4,321,707 | 3/1982 | Beasley et al. | 455/606 |
| 4,504,976 | 3/1985 | Beaudet | 455/611 |
| 4,553,268 | 11/1985 | Tilly | 455/607 |
| 4,637,072 | 1/1987 | Hellström | 455/607 |
| 4,720,827 | 1/1988 | Kanaji | 370/4 |

FOREIGN PATENT DOCUMENTS

| | | | |
|---|---|---|---|
| 0019005 | 2/1977 | Japan | 455/606 |
| 2014723 | 8/1979 | United Kingdom | 455/607 |

OTHER PUBLICATIONS

Valvo, Jun. 1988, p. 113.

*Primary Examiner*—Reinhard J. Eisenzopf
*Assistant Examiner*—Kinfe-Michael Negash
*Attorney, Agent, or Firm*—James C. Jangarathis

[57] ABSTRACT

Apparatus for bidirectional transmission of optical signals between two stations connected by a light transmission path of optical fibers, each station including a laser module comprised of a laser diode and an adjacent monitor diode, the latter performing the dual functions of detecting light emitted by such laser diode in its transmission mode, and for detecting light transmitted from the other station when such adjacent laser diode is not in its transmission mode.

5 Claims, 2 Drawing Sheets

APPARATUS FOR BIDIRECTIONAL TRANSMISSION OF OPTICAL SIGNALS

This application is a continuation-in-part, of our co-pending U.S. patent application Ser. No. 07/261,344, filed Oct. 24, 1988 now abandoned.

The invention relates to apparatus for bidirectional transmission of optical signals between two stations over a light transmission path; and, more particularly, to the employment of laser modules at each of such stations.

BACKGROUND OF THE INVENTION

It is priorly known to transmit optical signals through light transmission paths comprised of optical fibers. For generating the optical signals laser diodes and monitor diodes have been combined to form laser modules that control the optical signals generated. The employment of monitor diodes in association with regulators control the efficiency of the laser diodes in such laser modules. Without such employment of the monitor diodes, the control of the efficiency of the laser diodes is extremely difficult and complex, both as to circuitry and expense. Deviations in the generation of optical signals of the laser diodes caused by manufacturing variations, as well as temperature and aging influences, may be obviated by the regulation provided by the monitor diodes.

British Patent Application 2,000,373 is directed to diodes that function alternately as emitters and detectors of light of the same wave length. It is known to make diodes which, when biased in the forward direction, are capable of emitting light rays in a certain frequency band and, which, when biased in the backward direction, are capable, when exposed to the same rays, of generating electrical signals in response. In this prior art reference there is disclosed an optical fiber telecommunication system wherein first and second diodes are connected at opposite ends of an optical transmission fiber for alternating transmissions. When the first diode is biased in the forward direction, the second is biased in the backward direction and the system functions in the direction of the first diode to the second; and in the opposite case, the system functions in the direction of the second diode to the first diode. Accordingly, such diodes can be alternately switched from transmitter to receiver, depending upon the desired direction of transmissions during specific intervals of time.

Light diode circuits for half duplex operations are priorly known for transmitting optical signals through optical fibers. In such circuits the same light diodes are used as transmitters as well as receivers. When operating as receivers, such known circuits operate at low efficiencies since the light diodes are configured as transmitting diodes and not as receiving diodes. Consequently, the transmission of optical signals through the optical fibers is limited to short distances. Further, the use of such known circuits, because of such low efficiencies, are inappropriate for the transmission of information technology with associate high BIT rates.

Light transmitting semiconductor elements employed simultaneously both as optical transmitters and receivers are also priorly known. However, such semiconductor elements can convert the received signals only with low efficiency because their structures are configured appropriately for transmitting only and, accordingly, suitable for only short distance transmissions.

OBJECTS OF THE INVENTION

An object of the present invention is to provide a novel apparatus for improved bidirectional transmission of optical signals through a light transmission path including optical fibers.

Another object of the present invention is to employ the same structural elements at each end of the light transmission path, for efficiently transmitting and receiving optical signals.

SUMMARY OF THE INVENTION

These and other objects of the invention are achieved by a novel apparatus for bidirectional transmission of optical signals between two stations connected by a light transmission path of optical fibers. In such apparatus there is positioned at each end or station of such path a laser module operable as an optical transmitter. Each of such laser modules includes a laser diode and a monitor diode, wherein the monitor diode is operable as a receiver of optical signals from the distant station during time intervals the local laser module is not transmitting. Each of such monitor diodes included in such laser modules as a receiving diode, is structurally designed for such high efficiency receiving purposes. Accordingly, it optimizes the reception of the received optical signals and renders the present apparatus suitable for long distance transmission.

BRIEF DESCRIPTION OF THE DRAWINGS

A better understanding of the present invention as well a the objects and advantages thereof will become apparent upon consideration of the following detailed disclosure thereof, especially when taken with the accompanying drawings; wherein

Referring to FIG. 1, a transmission station 1 is connected to a transmission station 2 by means of a light transmission path comprised of an optical fiber. Included in each of the transmission stations 1 and 2 are communication components such as amplifiers, converters, connecting devices and terminal devices of a commonly known character which are not shown in detail but are represented by the blocks labeled communication circuits 5. The optical fiber 3 is connected at its respective ends to a laser module 4 included in transmission station 1, and a laser module 4 included in transmission station 2. The circuit features of the laser modules 4 are similar in all respects. The optical signals transmitted between the transmission station 1 and the transmission station 2 by way of the optical fiber 3, are bidirectional, i.e., the transmissions from one station in one direction are interposed between transmissions in the other direction during time breaks in transmissions of the other station. Priorly known switching methods employed in customary telephone transmission systems may be employed in association with the instant apparatus for interposing the optical signals.

As illustrated in FIG. 2, the laser module 4 includes a laser diode 6 employed as a light transmitter, and a monitor diode 7. One electrode of the laser diode 6 is connected to a voltage source of +5 volts, while the transmission side of laser diode 6 is positioned in front of an end face of the optical fiber 3. The monitor diode 7 is positioned at the control side of the laser diode 6. Connected to the one side of the monitor diode 7 is a regulator 8 to which a reference voltage is applied at a nominal value which corresponds to an efficiency of the laser diode 6 of 0.25 mw, for example. The regulator 8 is connected to a set member 9 which is disposed in and controls the power path of the laser diode 6. The regulator 8 may comprise, for example, an operations amplifier; while the set member 9 may comprise, for example, a transistor T and two resistors R1 and R2, as depicted in FIG. 4.

With reference to FIG. 4, the set member 9 is comprised of a transistor T having its emitter and collector electrodes connected between the laser diode 6 and ground, and its base electrode serially connected to the input terminal E of the set member 9 by way of a resistor R1. The base electrode of the transistor T is further serially connected to an output side of the regulator 8 by way of a resistor R2. Optical signals to be transmitted over the optical fiber 3 are achieved by the application of a modulation signal S applied to the input terminal E of the set member 9.

FIG. 5 depicts a characteristic curve K of the laser diode 6, with its emitted light intensity P indicated by the vertical coordinate and the electric current I coming to the laser diode 6, indicated by the horizontal coordinate. Point X on the characteristic curve K is the threshold point or current at which the laser diode starts emitting light. The intensity of the emitted light increases with increasing current I, dependent on the incline of the characteristic curve K. The magnitude of the distance A between X1 and X2, along the horizontal coordinate, is determined by the value of the resistor R1.

Figure 1:
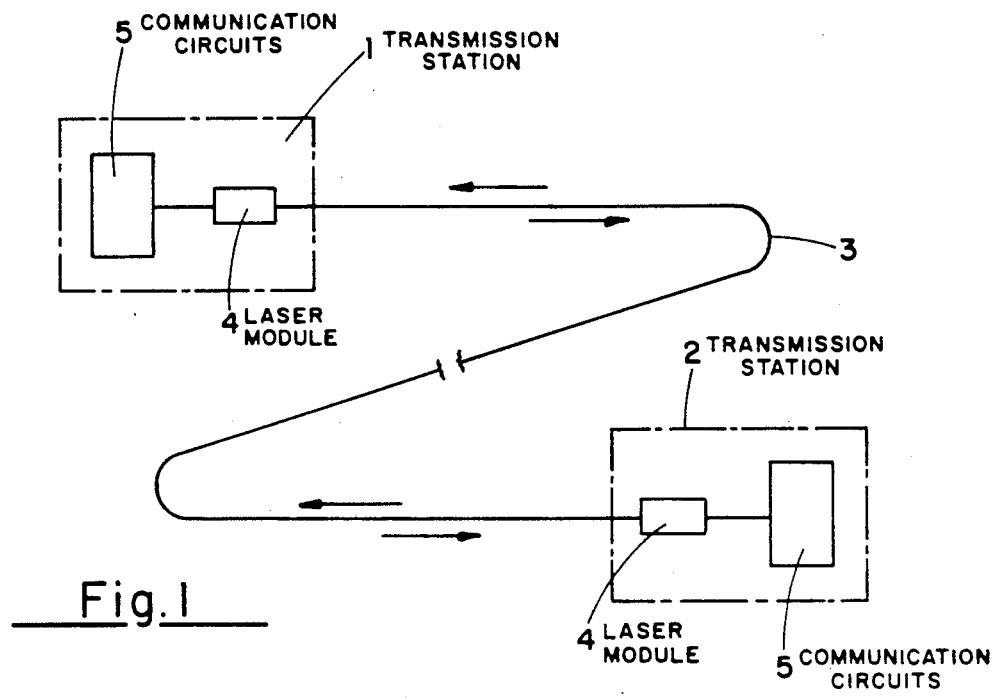
FIG. 1 is a diagrammatic representation of apparatus for bidirectional transmission of optical signals between a first station and a second station.
Figure 2:
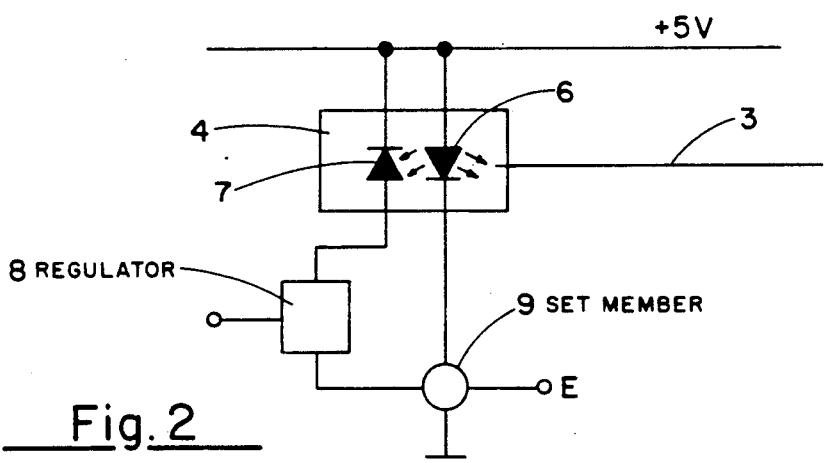
FIG. 2 is a circuit diagram of a laser module in its transmitting mode, employed in the apparatus of FIG. 1.

In the absence of the application of the modulation signal S, the current to the transistor T from the regulator 8 is of such value that the current flowing to the laser diode 6 by way of the transistor T is slightly less than the value of the threshold current at X of the characteristic curve K. When the current from the regulator 8 is modulated by the modulation signal S, the "low"-signal value causes no significant change in the current flowing to the laser diode 6 (i.e., it remains at the current level at X1); and the "high"-signal value causes a sharp increase in the current flowing to the laser diode 6 (i.e., such current increases from that at X1 to that at X2 on the characteristic curve K). Accordingly, the laser diode 6 becomes a high efficiency, light-emitting diode with a sharp increase in its emitted light intensity P.

When transmitting optical signals, the laser diode 6 radiates light in the direction of the end face of the optical fiber 3, as well as light in the direction of the monitor diode 7. The light falling onto the monitor diode 7 is in direct proportion to transmission efficiency. The power delivered by the monitor diode 7 as the result of receiving such light radiation is compared in the regulator 8 with a predetermined nominal value of the reference voltage. The regulator 8 assures a constant adjustment of the power flowing to the laser diode 6 by means of the set member 9, so that a predetermined light efficiency of the laser diode is maintained. The phrase "light efficiency" means the transmission efficiency of the laser diode 6.

Figure 3:
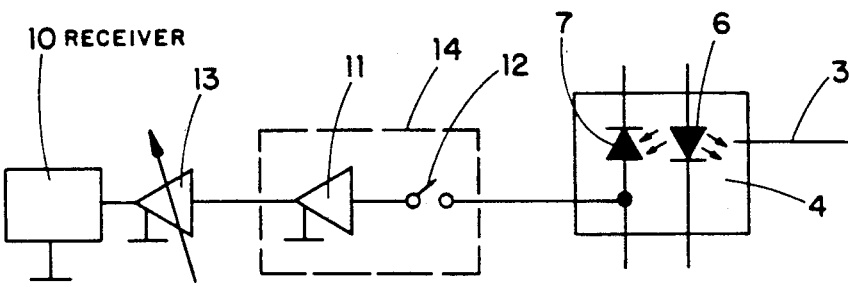
FIG. 3 is a circuit diagram of the laser module in a nontransmitting mode, in association with receiver circuitry.
Figure 4:
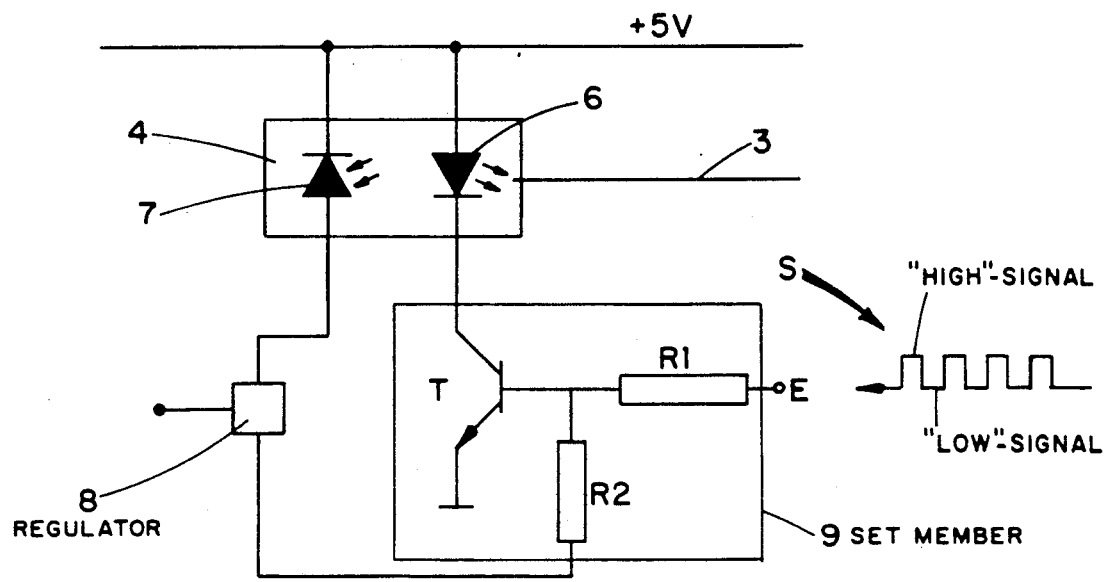
FIG. 4 is a circuit diagram of the laser module in its transmitting mode of FIG. 2, with the component elements of a set member indicated.
Figure 5:
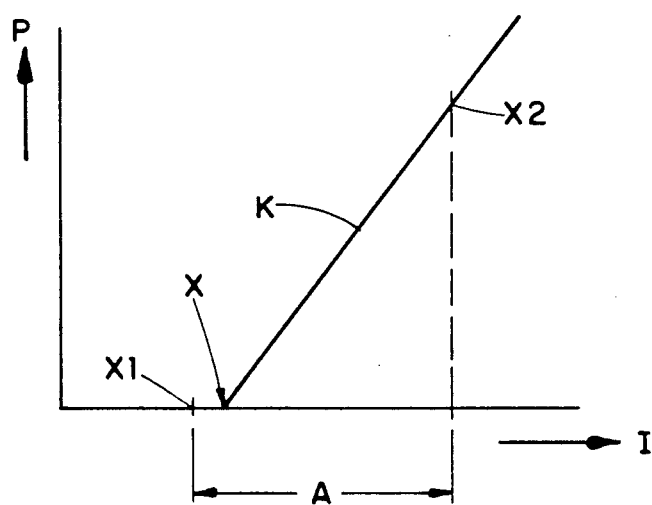
FIG. 5 is a characteristic curve of a laser diode included in the laser module of FIG. 4.

With reference to FIG. 3, no light is radiated from the laser diode 6 when the transmitter station 1 is in a break or nontransmission mode. During this time interval the monitor diode 7 of the laser module 4 is employed as a receiver of optical signals transmitted by transmitter station 2 through the optical fiber 3. Such incoming signals generate in the monitor diode 7 a power which is proportioned with the light efficiency. This power is fed to a receiver 10 by way of an amplifier 11 which is connected to monitor diode 7 by means of a switch 12. The switch 12 is closed preferably only when the transmitter station 1 is in a break or nontransmission mode, and is open when the laser diode 6 is radiating light signals. An adjustable amplifier 13 is connected between the receiver 10 and the amplifier 11. Preferably the switch 12 is comprised of a low capacitance MOSFET, and amplifier 11 and switch 12 are advantageously positioned in a metallic housing 14. During the receiving mode, the laser diode 6 of the receiving station is supplied with power less than its operational threshold level.

While the invention has been described in connection with an exemplary embodiment thereof, it will be understood that many modifications will be apparent to those of ordinary skill in the art and that this application is intended to cover any adaption or variation thereof. Therefore, it is manifestly intended that the invention be only limited by the claims and equivalents thereof.

What is claimed is:

1. Apparatus for bidirectional transmission of optical signals between a first station and a second station connected by a light transmission path including optical fibers, comprising:
   means for transmitting optical signals in a first direction to said second station, said first transmitting means including a first optical transmitter located at said first station, said first optical transmitter including a first laser module comprised of:
   a first laser diode positioned adjacent to the end of said light transmission path for emitting light into said path; and
   a first monitor diode positioned behind said first laser diode for detecting light emitted by said first laser diode upon the transmission of optical signals from said first station to said second station, and for detecting light transmitted through said light transmission path and said first laser diode upon the transmission of optical signals from said second station to said first station; and
   a second means for transmitting optical signals in a second direction to said first station, said second transmitting means including a second optical transmitter located at said second station, said second optical transmitter including a second laser module comprised of:
   a second laser diode positioned adjacent to the other end of said transmission path for emitting light into said path; and
   a second monitor diode positioned behind said second laser diode for detecting light emitted by said second laser diode upon transmission of optical signals from said second station to said first station, and for detecting light transmitted through said light transmission path and said second laser diode upon the transmission of optical signals from said first station to said second station.

2. Apparatus in accordance with claim 1, further comprising a first amplifier and a first receiver serially connected to said first monitor diode; and a second amplifier and a second receiver serially connected to said second monitor diode.

3. Apparatus in accordance with claim 2, further comprising a first switching means connected between said first monitor diode and said first amplifier; and a second switching means connected between said second monitor diode and said second amplifier.

4. Apparatus in accordance with claim 3, wherein said first switching means and said first amplifier are positioned within a first metallic housing, and said second switching means and said second amplifier are positioned with a second metallic housing.

5. Apparatus in accordance with claim 1, wherein said first laser diode is supplied during a receiving mode of said first station with a power less than its operational threshold level and said second laser diode is supplied during a receiving mode of said second station with a power less than its operational threshold level.

* * * * *